United States Patent [19]

Jaccard

[11] 4,199,841

[45] Apr. 29, 1980

[54] HAND MEAT TENDERIZER

[75] Inventor: André R. Jaccard, Holland, N.Y.

[73] Assignee: Jaccard Corporation, Buffalo, N.Y.

[21] Appl. No.: 853,840

[22] Filed: Nov. 22, 1977

[51] Int. Cl.² .............................................. A22C 9/00
[52] U.S. Cl. ......................................... 17/30; 30/305
[58] Field of Search ......................... 17/25, 28, 30, 31; 30/305

[56] References Cited

U.S. PATENT DOCUMENTS

| 207,107 | 8/1878 | Davies | 17/30 |
| 1,047,346 | 12/1912 | Walker | 17/25 |

FOREIGN PATENT DOCUMENTS

| 100102 | 2/1898 | Fed. Rep. of Germany | 30/305 |
| 1585702 | 1/1970 | France | 17/25 |
| 93323 | 11/1938 | Sweden | 17/30 |

Primary Examiner—Travis S. McGehee
Attorney, Agent, or Firm—Ashlan F. Harlan, Jr.

[57] ABSTRACT

A hand meat tenderizer which allows a plurality of incisions to be made simultaneously in a meat cut and which comprises a plurality of penetrating or piercing elements held by a handle and a stripping plate tending to retract said elements.

6 Claims, 6 Drawing Figures

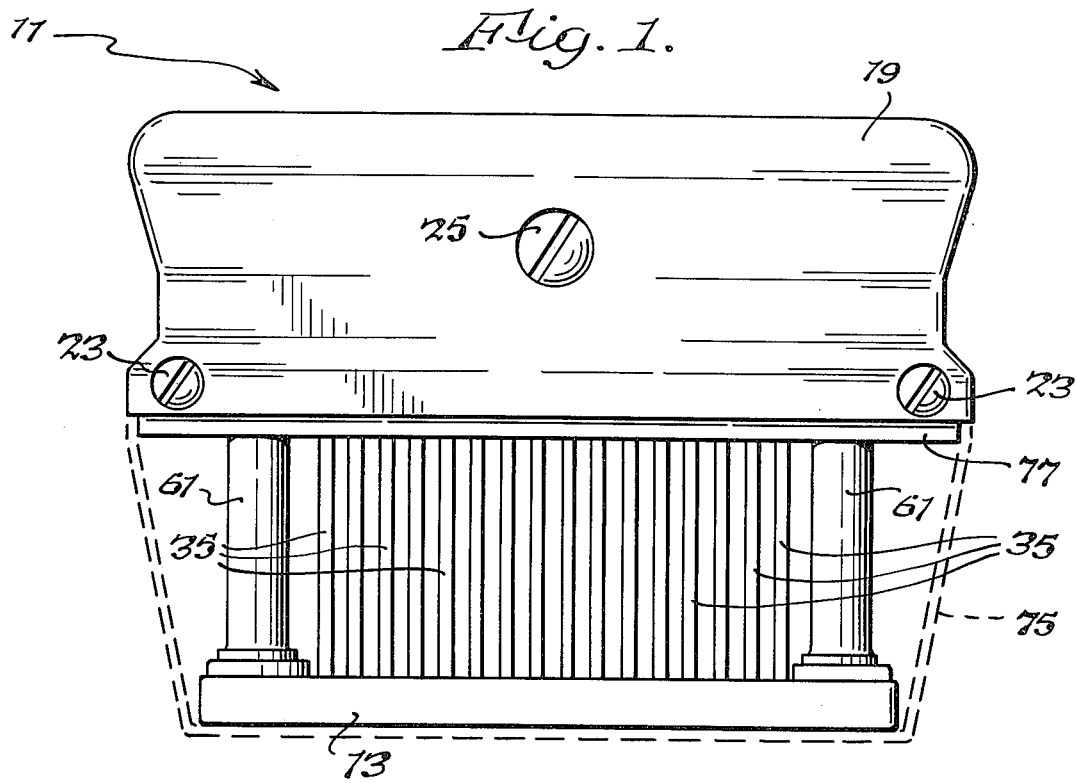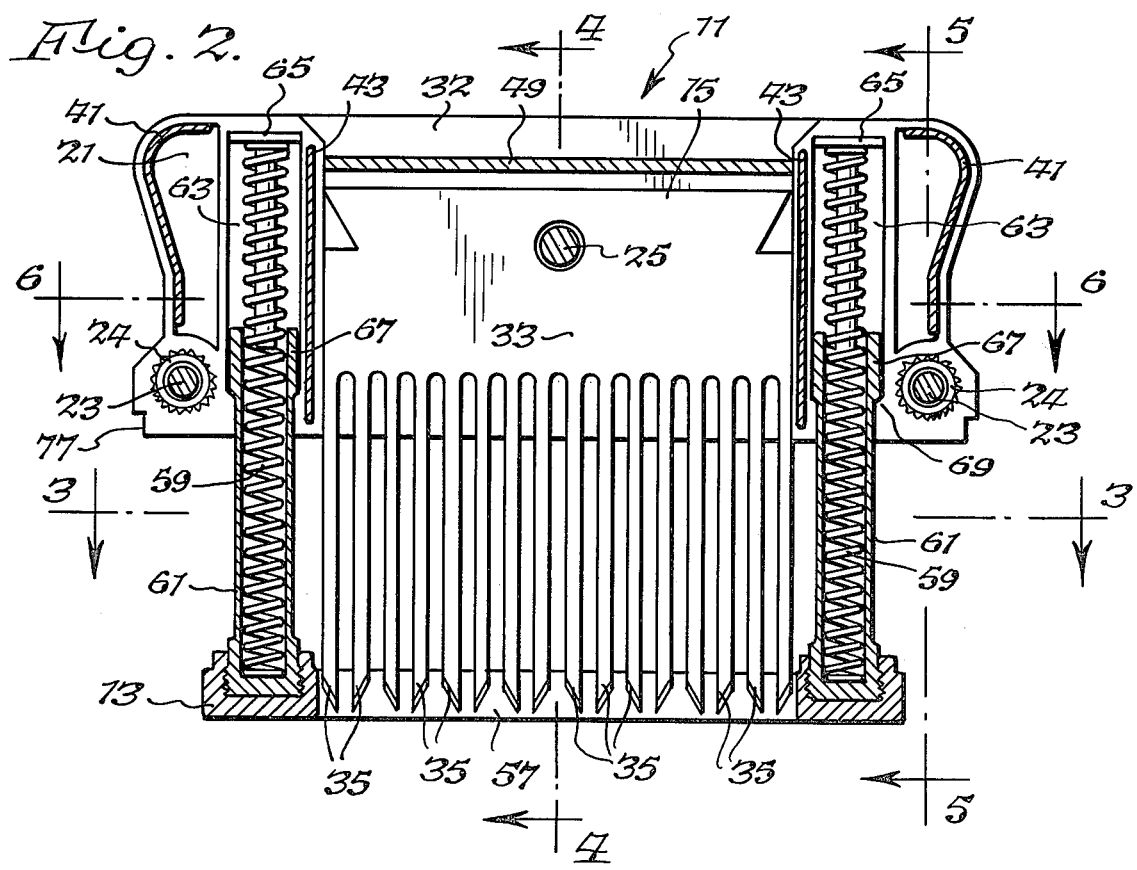

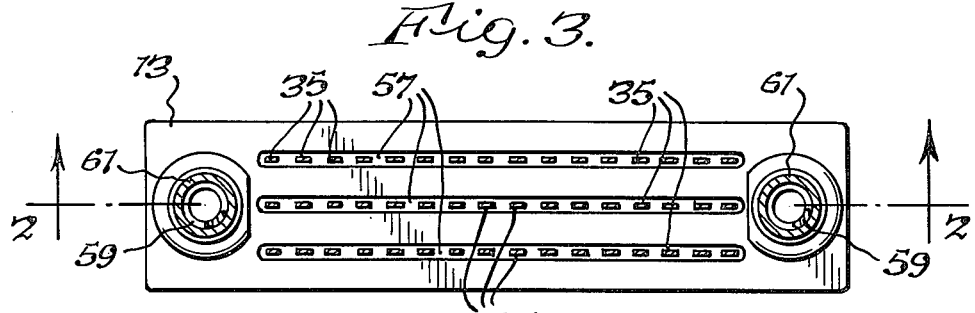
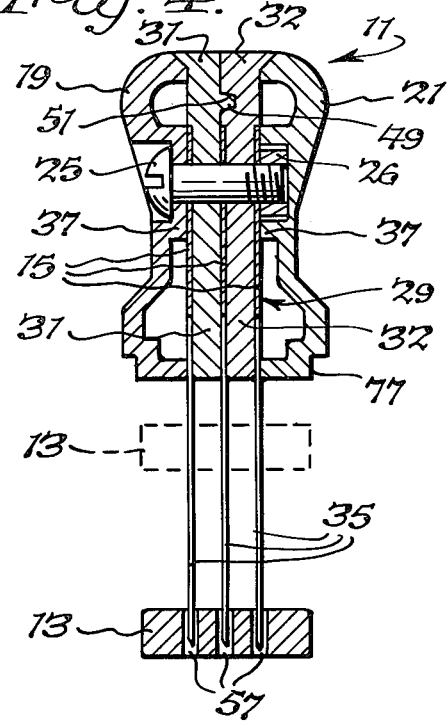
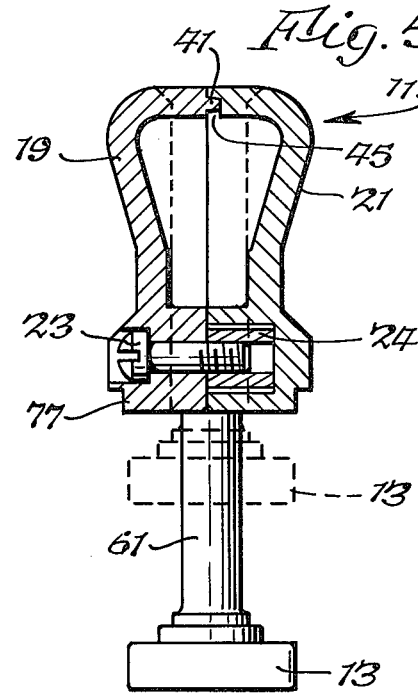
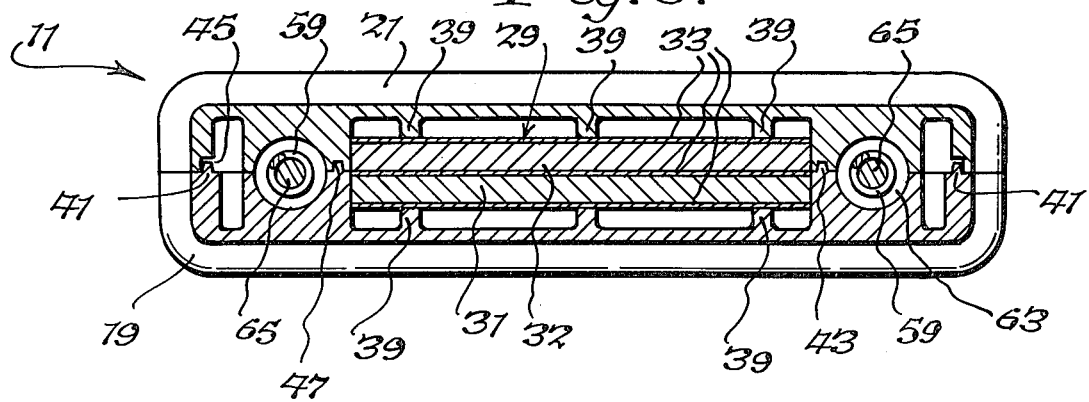

HAND MEAT TENDERIZER

BACKGROUND OF THE INVENTION

It is well known that meat cuts are often tough, in some cases so tough as to make them difficult to cut and virtually impossible to chew. Although chemicals, e.g. certain enzymes, have been employed to soften or partially dissolve the tough tissues, there are objections in some quarters to the use of such chemicals. Mechanical tenderizing is known in which the meat cut is subjected to pounding or beating by mallet-like instruments or is pressed by interfitting dies, as in making "cube" steaks. In still other cases, piercing elements of various shapes have been forced into the meat, thus severing or breaking meat tissues and making it easier to cut and/or chew. While the last-mentioned procedure can be particularly effective, in most instances the mechanisms for effectively carrying out the procedure have been large and expensive and, therefore, suitable only for use by a meat packer or wholesaler, or in a restaurant. Small machines for this purpose, suitable for household use, have existed but in general they have been relatively ineffective and/or difficult to maintain in sanitary condition.

SUMMARY OF THE INVENTION

It is an object of the present invention to provide a hand meat tenderizer of the piercing element, penetrating type which is simple in construction, easy to use and maintain in sanitary condition, and effective in operation. In the embodiment of the invention shown and described, the tenderizer comprises a blade segment assembly that is clamped and held in a handle. The latter is formed in two interfitting parts and can be easily disassembled to remove and replace the blades or penetrating elements. The blade segment assembly comprises a plurality of spacer blocks and a plurality of blade segments, each of the spacer blocks having a blade segment on each side thereof. Each blade segment comprises a plate from one edge of which a plurality of relatively thin, flat knives project in spaced, parallel array. Such knives are adapted to penetrate and thus tenderize a meat cut. To assist in withdrawing the knives from the meat cut, the tenderizing device includes a stripping plate slidably carried by said handle and resilient means biasing said stripping plate away from said handle.

BRIEF DESCRIPTION OF THE DRAWINGS

FIG. 1 is a front elevation of a novel hand meat tenderizer according to the present invention;

FIG. 2 is a vertical cross section of the tenderizer illustrated in FIG. 1 taken along the line 2-2 of FIG. 3;

FIG. 3 is a horizontal sectional view taken on the line 3—3 in FIG. 2;

FIG. 4 is a vertical sectional view taken on the line 4—4 of FIG. 2;

FIG. 5 is a vertical sectional view taken on the line 5—5 of FIG. 2; and

FIG. 6 is a horizontal sectional view taken on the line 6—6 of FIG. 2.

THE INVENTION

The hand tenderizer of the present invention comprises, as depicted, a hollow handle 11 shaped for easy grasping with one hand, a stripping plate 13 slidably carried by said handle, a plurality of blade segments or plates 15 mounted in and carried by said handle, and resilient means for biasing said stripping plate away from said handle.

The handle 11 preferably comprises interfitting, recessed members 19 and 21 which are secured together, adjacent their ends, by bolts 23 and secured together, substantially centrally, by a bolt 25. The bolts 23 extend through the handle member 19 and are threadedly received in nuts 24 secured against rotation in the handle member 21. The central bolt 25 extends through the handle member 19 and the blade segments 15 and is threaded, at its inner end, in a nut 26 secured in the handle member 21.

Interposed between said handle members 19 and 21 is a blade segment assembly 29 which comprises a plurality of blade segments 15 and spacer blocks 31 between and in contact with adjacent blade segments over a considerable portion of the flat surfaces of the latter. The construction of a blade segment 15 is best shown in FIG. 2, where it will be seen that it comprises a generally rectangular plate 33, relatively thin as shown in FIG. 4, from which an array of narrow, thin blades 35 project along one edge. As used herein with reference to the blades and blade segments, "thin" denotes a thickness of about 0.03 in. to 0.04 in. or less. The blades 35 are preferably aligned, in parallel, evenly spaced relation, longitudinally of the segment, are preferably integral with the plate 33, and are sharpened on their projecting ends. While thin, narrow integral blades are preferred, it will be understood that such blades can be replaced by penetrating elements having other shapes in cross-section.

As shown in the illustrated embodiment of the present invention, the blade segment assembly 29 comprises three blade segments 15 and two spacer blocks 31, 32 with the intermediate blade segment being clamped between the spacer blocks. The outer blade segments 15 are clamped between a spacer block and one of the handle members 19 or 21. It will be understood, however, that in designing the present meat tenderizer provision can be made for any desired number of blade segments. The handle member 19 is also provided on the rear faces of its end portions with ribs 41 and 43 (see FIG. 6) that project into correspondingly shaped grooves 45 and 47, respectively, on the end portions of the handle member 21 when the tenderizer is assembled, to position the handle members and prevent lateral displacement thereof.

The spacer blocks 31 and 32 substantially identical. Each has a top portion at its ends and on its outer face. These portions engage in similarly flared portions of the handle members 19 and 21 and support the blocks 31 and 32 flush with the top face of the handle 11. To maintain the spacer blocks in registry, however, the block 31 is provided with a longitudinally extending, projecting rib 49 which fits in a complementary groove 51 provided in the block 32. As best shown in FIG. 4, the blade segments 15 associated with the spacer blocks 31 and 32 are maintained in vertical alignment prior to and while inserting the bolt 25 by engagement of the top edges of the segments with horizontal ledges or abutments 53 formed on the faces of the spacer blocks.

The stripping plate 13 is provided with slots 57 therethrough for reception of the blades 35 carried by the blade segments 15. The slots 57 serve to guide the blades 35 and to reduce the chances of their bending as they penetrate the meat cut. The plate 13 is mounted for reciprocating movement toward and away from the handle 11 by resilient means which comprises a pair of compression springs 59, retained in tubes 61. The latter are suitably secured in the plate 13, adjacent the ends thereof, and extend at their upper ends into cylindrical wells 63 formed in the handle 11 by complementary molded cavities in the handle members 19 and 21. Preferably, the springs 59 are provided at their upper ends with plungers 65 that engage the top, inner ends of the wells 63. The upper ends of the tubes 61 are enlarged as shown at 67 and are slidably engaged in the wells 63. The latter are reduced in diameter at their lower ends whereby to provide internal shoulders 69 which serve to retain the enlarged portions 67 of the tubes 61 within the wells 63.

As is evident from the illustration of FIG. 2, the stripping plate 13 is biased away from the handle 11 by the springs 59 and normally occupies a position in which the sharp ends of the knife blades 35 have been retracted into the slots 57 of the plate 13 where they will not be accidently engaged, with possibility of injury to the user. However, pressure on the handle 11 while the stripping plate 13 is held against vertical movement will tend to project the blades 35 through the slots 57 for penetration into any yielding material beneath, such as a piece of meat. Obviously, when using the tenderizer the stripping plate tends to hold the meat while the springs 59 retract the blades 35. To protect the present novel tenderizer and prevent accidents resulting from careless handling, a cover may be provided for the exposed portions. Such a cover is shown in broken lines in FIG. 1 and is denoted by the reference numeral 75. It comprises a cap which encloses the stripping plate 13 and has its open end snapped on the flange portions 77 that project from the handle members 19 and 21 so as to be detachably held in place over the blades and stripping plate.

The operation of the novel meat tenderizer of the present invention is simple. The device is merely rested on the meat cut to be tenderized and hand pressure on the handle 11 forces the blades 35 into the meat, thus making simultaneously a plurality of incisions in the meat cut. The sharpened ends of the blades easily penetrate the meat and in doing so cut connective tissue. After allowing the blades 35 to retract, the device is shifted to another place on the meat surface and again pressed to make additional incisions. This process is repeated as many times as is desired. Even though a large number of penetrating operations are thus carried out, the meat portion or cut still retains its integrity and does not become mushy. It does, however, become much easier to cut and/or chew.

It will be evident that the present novel tenderizer is easy to use and is simple to assemble and disassemble. Thus, blade segments can be easily removed for sharpening or replacement and the device is easily kept clean. Since only the stripping plate and the projecting knife blades contact meat, they can be easily cleaned with a strong spray of hot water and detergent. The handle, spacer blocks, stripping plate, and cover are preferably formed of a suitable molded plastic material which can be easily washed and sterilized when necessary.

It will be understood that the present invention shall not be considered as limited to the precise construction shown and described herein, but shall be interpreted as broadly as permitted by the appended claims.

I claim:

1. In a meat tenderizer adapted to be manually operated: a handle, said handle comprising a pair of separable, complementary members; a blade segment assembly comprising a plurality of blade segments secured between said members in said handle and projecting from said handle, each of said blade segments comprising a thin plate having a plurality of spaced, sharpened knife blades projecting from one edge thereof; a stripping plate slidably carried by said handle; and resilient means associated with said stripping plate and said handle for biasing said stripping plate away from said handle, said stripping plate being formed to permit passage of said knife blades therethrough, said blade segment assembly also comprising a plurality of spacer blocks, each of said blocks being between and in contact within said handle with a pair of said blade segments over a substantial area of each of said pair of blade segments, and having an interfitting ridge and groove connection with an adjacent block.

2. A meat tenderizer as defined in claim 1 wherein said handle members and said blade segment assembly are secured together by a bolt extending through one of said handle members and said assembly and threadedly engaged in the other of said handle members.

3. A meat tenderizer as defined in claim 1 wherein each of said spacer blocks is provided with a horizontal abutment for engagement by an edge of a blade segment whereby said segments are maintained in alignment.

4. A meat tenderizer as defined in claim 1 wherein there is provided a snap-on cover enclosing said blades and said stripping plate.

5. A blade segment assembly adapted for use in a manually operated meat tenderizer which comprises a plurality of blade segments and a plurality of spacer blocks, each of said blocks being between and in contact with a pair of said blade segments, each of said segments comprising a thin metal plate having a plurality of spaced, sharpened knife blades projecting from one edge thereof; said spacer blocks and said segments being approximately the same length, at least one of said blocks having a longitudinally extending abutment on each side thereof, each abutment being adapted to be engaged by the top edge of one of said segments whereby to maintain said segments aligned, and said blocks being provided with interfitting, aligning ridges and grooves.

6. A blade segment assembly adapted for use in a manually operated meat tenderizer which comprises a plurality of blade segments and a spacer block between and in contact with a pair of said segments, each of said segments comprising a thin metal plate having a plurality of spaced, sharpened knife blades projecting from one edge thereof; said spacer block and said segments being approximately the same length and said block having a longitudinally extending abutment on each side thereof, each abutment being adapted to be engaged by the top edge of one of said segments whereby to maintain said segments aligned, and said block being so formed as to permit an interfitting ridge and groove connection with another, adjacent block.

* * * * *

UNITED STATES PATENT AND TRADEMARK OFFICE
CERTIFICATE OF CORRECTION

PATENT NO. : 4,199,841
DATED : April 29, 1980
INVENTOR(S) : Andre R. Jaccard

It is certified that error appears in the above–identified patent and that said Letters Patent are hereby corrected as shown below:

Column 2, line 50, -- are -- has been inserted after "32".

Column 2, line 51, -- flared -- has been inserted after "portion".

Signed and Sealed this

Fourth Day of November 1980

[SEAL]

Attest:

SIDNEY A. DIAMOND

Attesting Officer     Commissioner of Patents and Trademarks